United States Patent [19]

Del Rosso

[11] Patent Number: 4,570,729
[45] Date of Patent: Feb. 18, 1986

[54] HIGH SPEED TRANSPORTING AND WEIGHING MACHINE WITH DYNAMIC BALANCE

[75] Inventor: Victor Del Rosso, Ithaca, N.Y.

[73] Assignee: Hi-Speed Checkweigher Co., Inc., Ithaca, N.Y.

[21] Appl. No.: 656,485

[22] Filed: Oct. 1, 1984

[51] Int. Cl.$^4$ .................... G01G 19/00; G01G 21/10
[52] U.S. Cl. ..................................... 177/145; 177/189
[58] Field of Search ................ 177/145, 184, 187, 189

[56] References Cited

U.S. PATENT DOCUMENTS

| | | | |
|---|---|---|---|
| 3,265,140 | 8/1966 | Mayer | 177/189 X |
| 3,347,328 | 10/1967 | Schieser et al. | 177/184 X |
| 4,114,707 | 9/1978 | Del Rosso | 177/145 |
| 4,440,249 | 4/1984 | Del Rosso | 177/145 |

*Primary Examiner*—George H. Miller, Jr.
*Attorney, Agent, or Firm*—Bean, Kauffman & Bean

[57] ABSTRACT

There is disclosed a machine for transporting and weighing or checkweighing articles passing in succession thereon at high speeds, such as for use in conjunction with a rapid article feeding and take-away conveyor system or the like and with weight-signal transmitting/converting/calculating printout devices for visual display and price labeling operations or the like. The machine includes a stationary machine base and a vertically flexible weight-measuring means supported by said base. A rigid cage-like structure encompasses and is supported by said weight-measuring means, and an article conveying device and a power supply means therefor is carried by said cage-like structure and comprises in combination therewith the minusculely vertically shifting tare weight component of the machine. The conveying device and the power supply means and the construction elements of the cage-like structure are so weight-related and positioned in the cage-like structure as to be substantially statically balanced and in equilibrium about the axes of the weight-measuring means. Therefore, the measuring means is shielded from effects of transitory force impingements upon the tare weight assembly such as would otherwise induce torque moments to operate on the assembly about the axes of the measuring means.

11 Claims, 13 Drawing Figures

HIGH SPEED TRANSPORTING AND WEIGHING MACHINE WITH DYNAMIC BALANCE

BACKGROUND AND OBJECTS OF THE INVENTION

This invention relates to high speed operating weighing/conveyor machines such as are used in the food and other commodity packaging/weighing/checkweighing industries or the like. Prior machines for such purposes are disclosed for example in U.S. Pat. Nos. 2,838,176; 3,070,214; 3,180,475; 3,955,665 and 4,114,707.

More particularly, the invention relates to so-called powered platform scales, such as are used in systems for weighing discrete articles being conveyed in succession at high speeds over a weighing device; the "net" weights of which in most cases are to be visually displayed and graphically recorded. Also, in some cases such measurements are used to control devices for rejection from the delivery line of underloaded or overloaded packages or containers, as is well known in the art. The weight detecting/reporting components of such prior machines are subjected to dynamic error inductive influences such as are not encountered by "stationary" platform type weighing machines.

Prior machines for such purposes have typically comprised vertically "stacked" structural assemblies, at the bases of which reside the load cell or other weight-measuring component which is surmounted by the article transport weighing conveyor which is driven by an externally based motor and drive system. Such assemblies are accordingly statically imbalanced and top-heavy and therefor inherently subject to magnification of typically encountered dynamic unbalancing forces which when transmitted to the article weight detecting mechanism result in inaccurate weight measurement reports. Also, such encounters may apply physically destructive forces upon the mechanism such as call for constant maintenance attention; shut-downs, and repair expenses.

Such unbalancing impulses may be introduced for example by environmental shop noises; conveyor belt flutterings; drive chain or belt chatter vibrations; vagarious placements on the conveyor of the items to be weighed, and the intermittent item on-loading/off loading effects on the conveyor such as tend to disrupt smooth running operations of the conveyor. In prior machines, such impulses develop into torque moment forces and on occasion acquire resonance, and operate through substantial leverages relative to weight-measuring mechanism; thereby interfering with accurate readings especially in the case of high speed operations.

The present invention features a unique system for mounting the masses of the loads-carrying conveyor mechanism thereof as well as its motor and power train components relative to the weight-measuring component(s) thereof. This enables the machine to operate at higher speeds (and therefore higher capacities) compared to machines previously available to the industry, while correctly reporting the net weights of items such as are fleetingly conveyed in succession thereover.

BRIEF SUMMARY OF THE INVENTION

This invention provides means whereby typically encountered operational disturbances such as are referred to hereinabove are more effectively nulled relative to the weight-measuring mechanism of the system, whereby to provide a more accurate weight reporting system of increased capacity. This is accomplished by integrating and locating the requisite tare weight components thereof such as include the conveyor carrying the items to be weighed; its power supply motor and transmission system and the supportive structures into a cage-like cradle assembly (which minusculely shifts vertically incidental to each weight-measuring operation).

This cage assembly is structured so as to be per se substantially statically balanced, and either rests upon or is suspended from the weight-measuring mechanism of the system which is mounted on a stationary base. The components of the cage assembly are weight-related and so located and spaced "in orbit" about the central axes of the weight measuring device as to be substantially in three-dimensionally statically balanced mode thereabout. Therefore, such above referred to extraneous and otherwise torque-inducing forces acting upon any part of the cage assembly, are in the case of this invention substantially counterbalanced out by reason of which the weight-measuring component of the system is shielded from the effects of such forces. Accordingly, more accurate weighing reports under higher speed (capacity) conditions are available to the industry.

Incidentally, machines of the invention may preferably employ load cells of the type which are per se designed to be resistant to extraneously generated torque-inductive stresses on the strain-gage component thereof, in order to attain optimum advantages of the improvement features of the present invention. The invention also provides an improved conveyor roller supporting arrangement which is hingedly mounted and latched into operative position, so that it is readily swingable out of its operative position. Thereupon, the endless elastic conveyor belt thereof may readily be "peeled" away from its mounting rollers for system component cleaning and/or belt replacement purposes.

BRIEF DESCRIPTION OF THE DRAWINGS

Preferred modes of employment of the invention are illustrated by the drawings herewith wherein.

DESCRIPTIONS OF THE PREFERRED EMBODIMENTS

Figure 1:
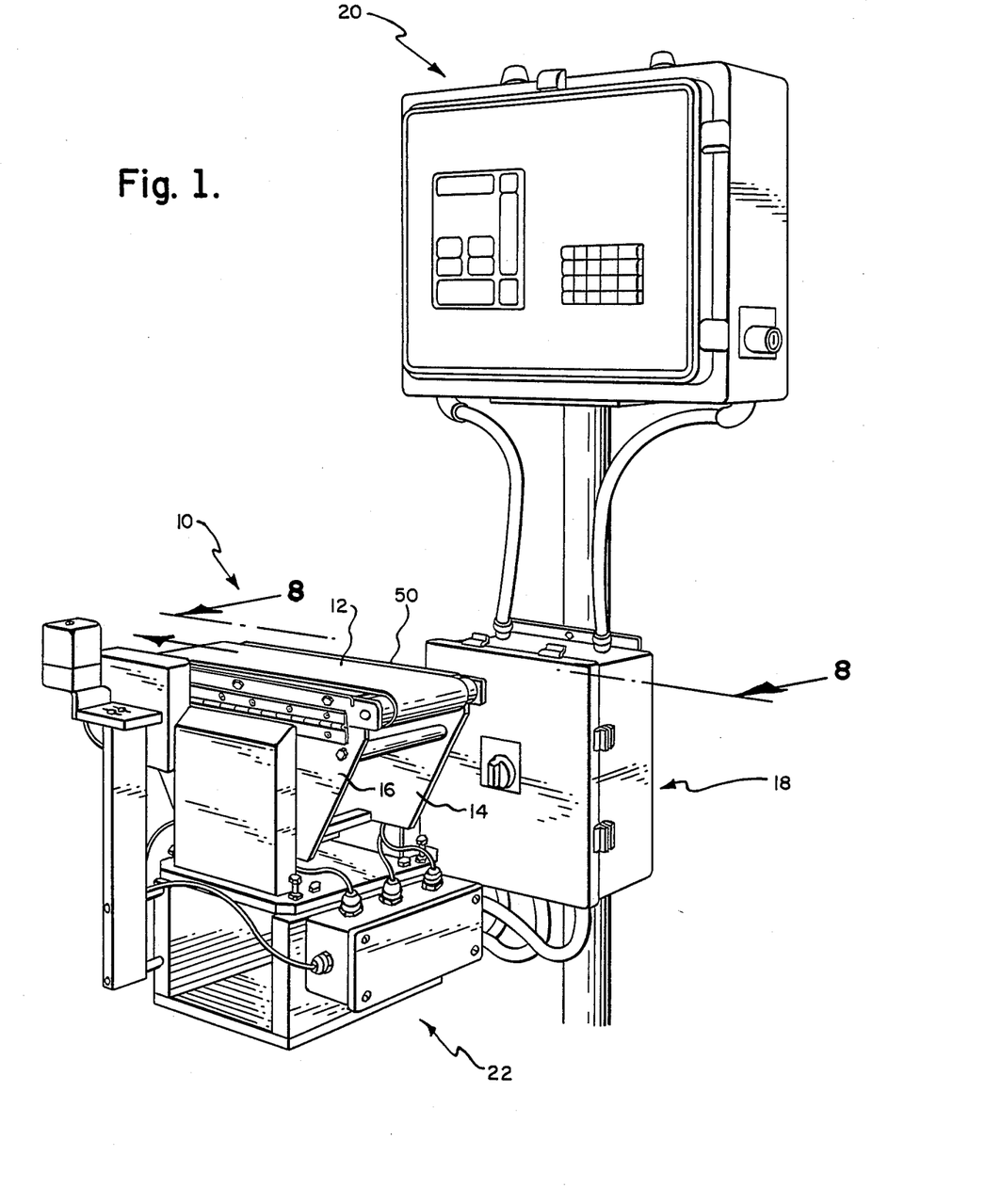
FIG. 1 is a perspective view showing one form of the invention in association with a typical visual display weight/ charge/total cost accounting and reporting console.

FIG. 1 of the drawing herewith is furnished by way of a perspective illustration of a typical high speed operating weighing or checkweighing/conveying machine incorporating one preferred form of the present invention. This is shown in operative conjuction with a commercially available analog-digital converter such as Model 710B marketed by the Quest Corporation of Macedonia, Ohio. Several such suitable weight reporting/transfer systems are presently available, and per se form no part of the present invention. As shown herein by way of example, the weighing or checkweighing/conveying component of the invention is designated generally by the numeral 10 and comprises an endless conveyor belt 12 carried by opposite end pulleys supported upon frame support panels 14,16.

Machines of this type are adapted to accommodate fleetingly received and discharged successions of discrete articles as they pass over the conveyor and to report to the auxiliary attendant analog-digital converter such as shown at 18 for coincident price per pound/weight/total cost of each item calculations for deliveries to the visual and tape recording devices of the console, such as is shown at 20. Suitable electrical power input and weight signal transfer arrangements (such as are designated generally by the numeral 22) and such as are well known in the industry are employed as auxiliaries to the system, and are only incidental to the present invention.

Figures 4, 5:
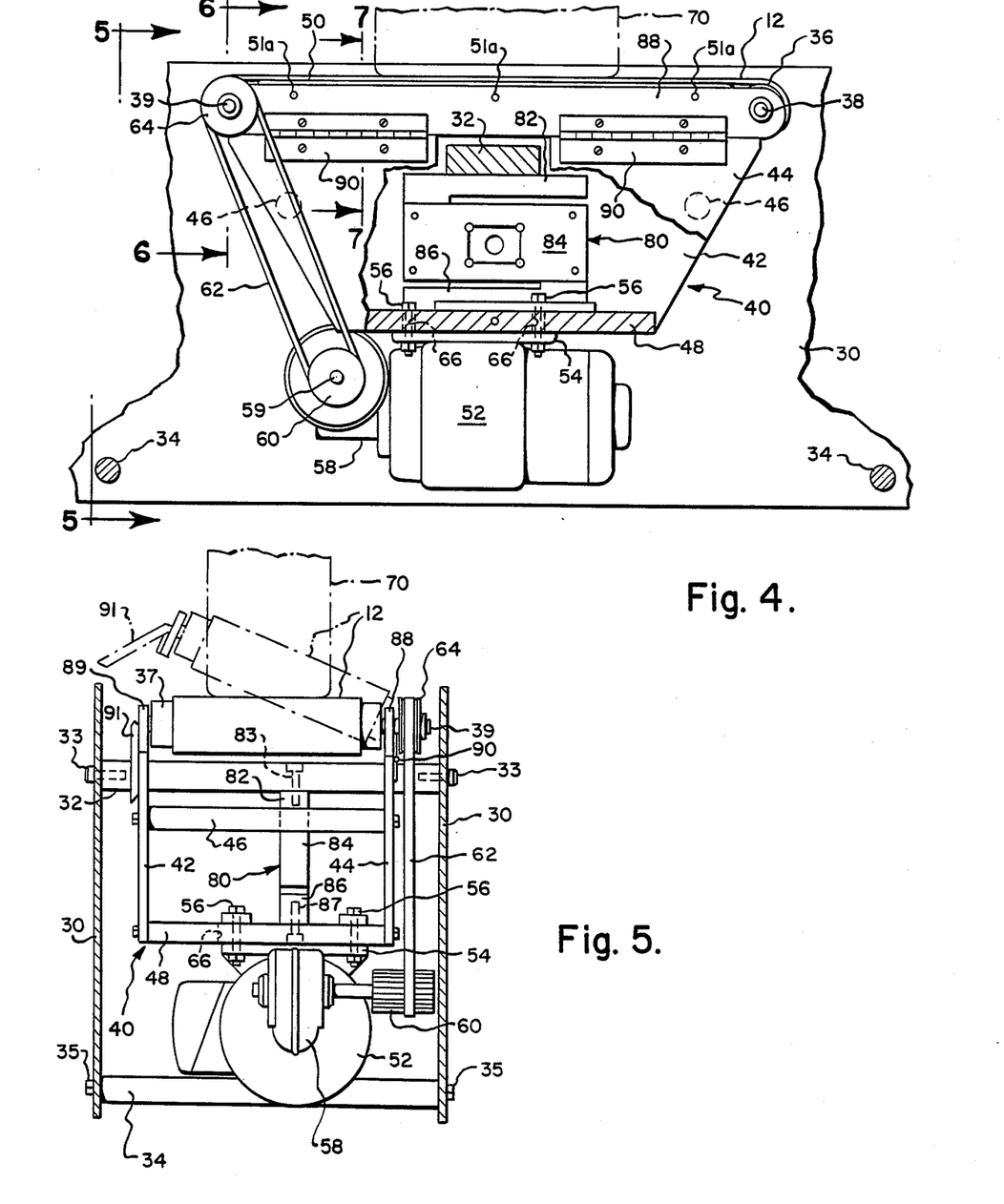
FIG. 4 is a reverse side elevational view taken as along line 4—4 of FIG. 2 and partially broken away to show interior components of the mechanism.
FIG. 5 is an end view suggested by line 5—5 of FIG. 4.

FIGS. 2-5 illustrate embodiment of the invention in a weighing or checkweighing/conveyor type machine of a somewhat different form compared to that shown in FIG. 1. In this case, by way of example, the base machine support may comprise a pair of upright standing parallel side wall frame panels 30,30, which are structurally interconnected into an open-ended box-like form at their upper level such as by means of a transverse strut 32 and machine screws 33,33; and at their lower level by struts 34,34 and machine screws 35. As best shown in FIGS. 4 and 5, the conveyor belt 12 is carried by rollers 36,37 which are endwise rotatably mounted by means of axies 38,39 upon a cradle-like chassis or cage which is designated generally by the numeral 40. The cage 40 comprises a pair of opposite side wall-like panel members 42,44 which extend longitudinally in parallelism with the conveyor belt 12. Transversely disposed struts 46,46 and a bottom plate 48 are provided as shown to form a box-like cradle, at the upper level of which is mounted the conveyor 12 by means of the rollers 36,37. A conveyor belt slide plate as shown at 50 (FIGS. 2-4 and 7) provides the "roof" of the chassis structure 40.

A conveyor driving motor as shown at 52 is mounted by means of bolting the motor base plate 54 to the bottom of the cradle bottom plate 48; the motor being thereby suspended therefrom such as by means of bolts 56,56. The motor unit includes a drive speed reduction gear box as shown at 58 from which extends the output shaft 59 carrying the belt drive pulley 60. The drive belt is shown at 62 and trains around a pulley 64 which is keyed to the shaft 39 carrying the conveyor roller 37. Preferably, the bolts 56,56 are accommodated within slotted portions 66 (FIGS. 4 and 5) of the bottom plate 48 extending transversely thereof in order that the motor/gear box unit may, if desired, be shifted laterally of the chassis center line for purposes to be more fully explained hereinafter.

Figures 2, 3:
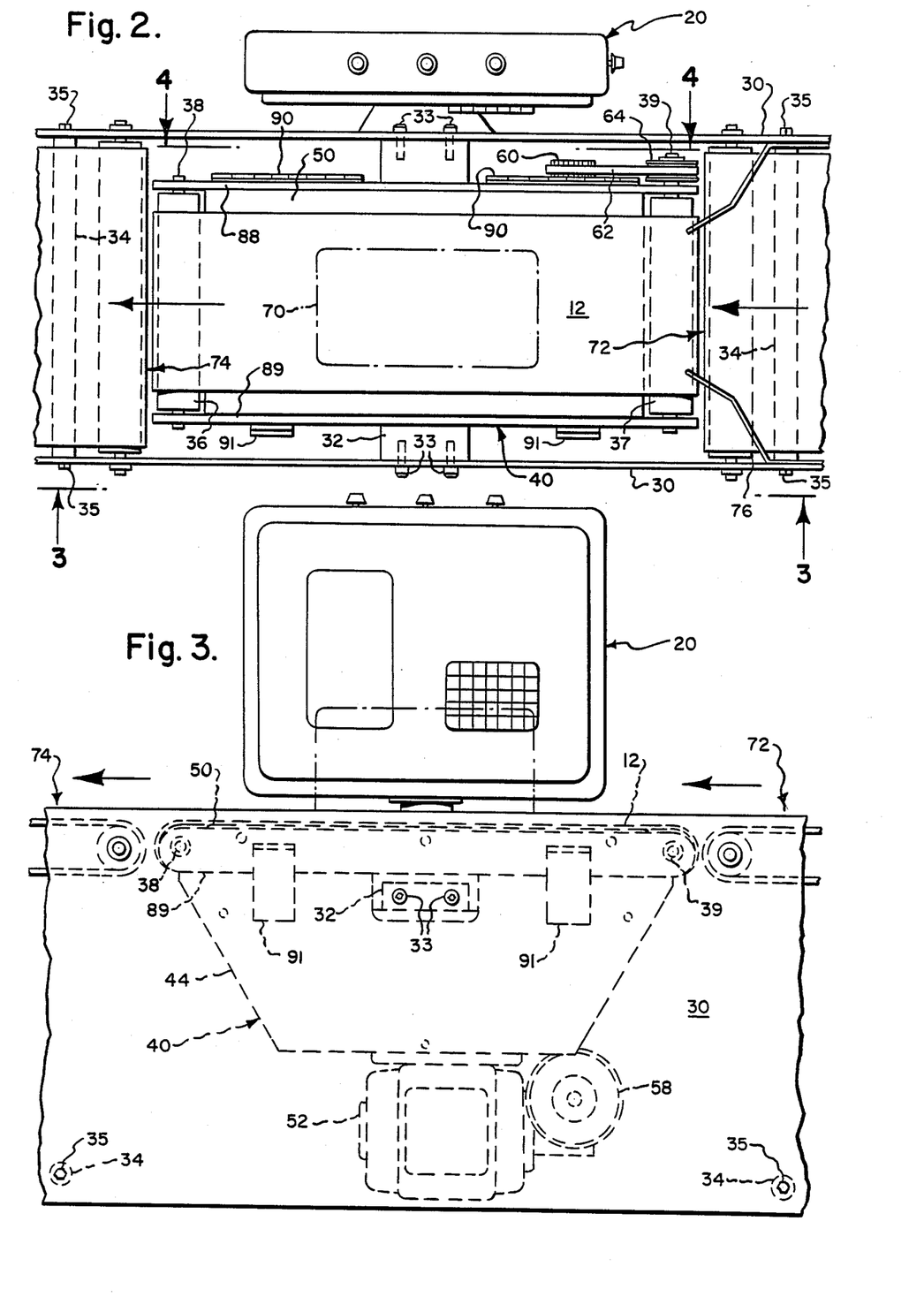
FIG. 2 is a top plan view of another form of the invention, shown in association with typically accommodating item supplying and discharging conveyors.
FIG. 3 is a front elevational view of the system shown in FIG. 2.

Thus, it will be appreciated that the relatively heavy components of the system, such as the above-board conveyor and below-board driving motor, are so relatively located in the cage assembly as to substantially counterbalance each other. This assembly, including the conveyor and its driving mechanism, as well as the supportive cage structure, represents the tare weight of the system over which pass items to be weighed such as are shown at 70. For example, such items may be delivered to the conveyor belt 12 as by a delivery conveyor 72 and discharged to a takeoff conveyor 74 as shown at FIGS. 2 and 3. As shown herein further by way of example, the delivery conveyor may be of the endless belt type carried by rollers as shown at 76 journalled on the side frame plates 30,30; and the takeoff conveyor 74 may similarly be of endless belt form carried by rollers also journalled on the side plates 30,30. However, it is to be understood that the item delivery and takeoff mechanisms form no part of the present invention and may be of any other suitable form and totally separate from the machine of the invention.

The cage assembly including the entire tare weight components of the system is suspended from and masscentered about the weight-measuring device which in this case is shown to be by way of example of the sometimes referred to "leverless type" load cell, and which is shown generally at 80 (FIGS. 4, 4a, 5 and 5a). Such load cells are currently available on the market and are structured and operate as explained for example in U.S. Pat. Nos. 4,143,727 and 4,146,100. In the drawing herewith at FIGS. 4 and 5, such a load cell is shown schematically at 80 to comprise a beam component 82 fixed to the cradle support bar 32 such as by means of a machine screw 83; an intermediate strain-gage component 84 and a lower beam component 86, which is affixed as by means or a machine screw 87 at one end to the cradle base plate 48. Thus, the entire cage assembly is suspended from the cross bar 32 by way of the load cell unit 80, whereby the strain-gage section 84 of the load cell is variously stressed in accordance with gross weight changes due to variations in the weights of the articles being transported by the conveyor 12. Such stress variations on the strain gage cause corresponding signal changes to be sent to the analog-digital converter 18, which may be of any suitable commercially available type and operates to translate the voltage outputs from the strain-gage transducer to weight-in-pounds readings on the display 20 (FIG. 1).

Figure 4A:
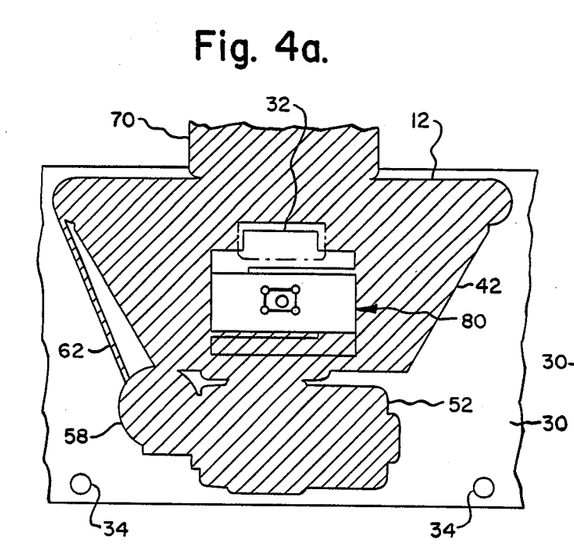
FIG. 4a corresponds somewhat to FIG. 4, but more graphically displays the movable (tare weight) structural assembly vis-a-vis the stationary framework of the machine.
Figure 5A:
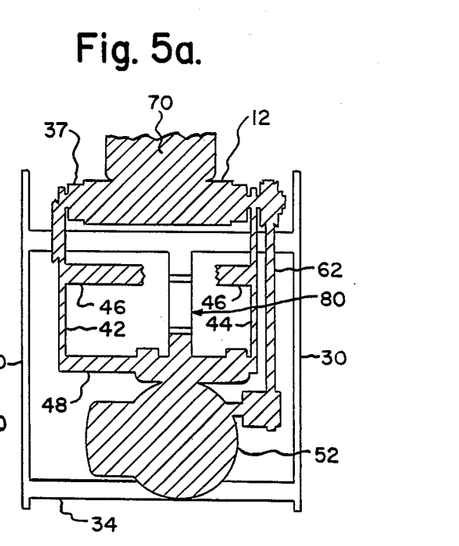
FIG. 5a corresponds somewhat to FIG. 5, but more graphically displays the movable (tare weight) structural assembly vis-a-vis the stationary framework of the machine.

It is a particular feature of this invention that as best illustrated at FIGS. 4a and 5a, the entire assembly which is minusculely vertically movable incidental to each weighing process (which comprises the gross weight of the system and includes the load to be weighed as well as the cage and its supported components) is substantially statically mass-centered and in equilibrium about the force-reactive axes of the load cell. This movable assembly is depicted by the shaded portion of FIGS. 4a and 5a with a view to graphically differentiating it vis-a-vis the stationary structure of the system. External disturbances effective against the movable assembly such as would otherwise apply transient torque forces to the load cell system and such as would disrupt accurate measurements of the weights of the items being transported by the conveyor are accordingly inoperative to influence accurate functionings of the load cell system. Hence, the machine may be operated at higher speed (capacity) than prior art machines while still providing at least equal or improved weight reporting accuracies.

Figure 6:
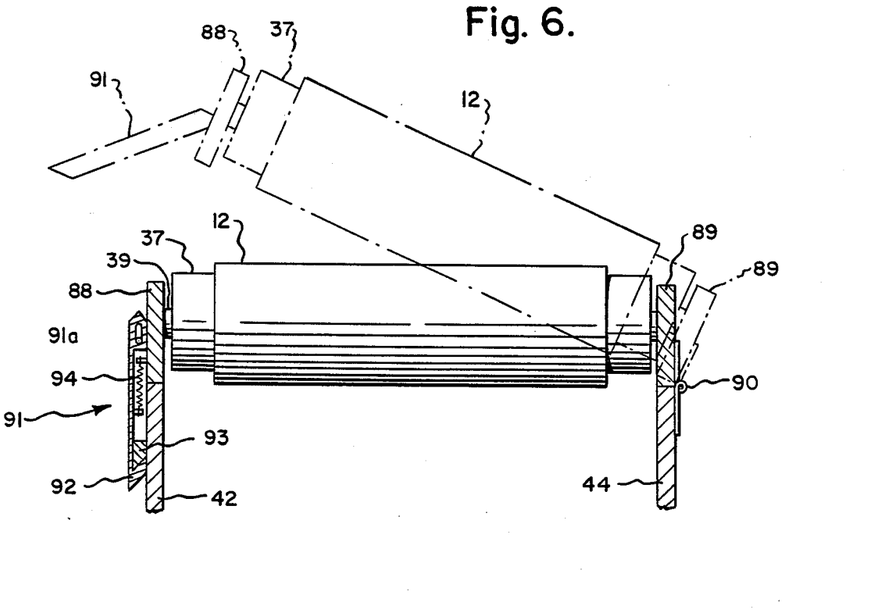
FIG. 6 is a fragmentary enlarged scale sectional view taken as along line 6—6 of FIG. 4 illustrating how the conveyor roller latching and hinging arrangement may be operated.
Figure 7:
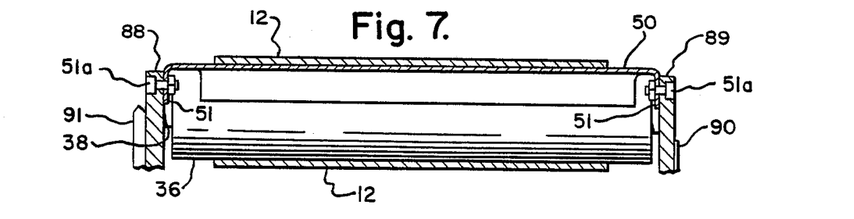
FIG. 7 is a fragmentary enlarged scale sectional view taken as along line 7—7 of FIG. 4 further illustrating a detail of the construction.

As best shown at FIG. 7, the conveyor belt slide plate 50 is margined by down-turned flange portions 51,51 which are fixed as by means of devices 51a to side rails 88,89 which lie along the tops of the cradle side plates 42,44 respectively. Rail 89 is hingedly connected as shown at 90 to cradle side plate 44 and the rail 88 is equipped with pivotal latch members 91,91 for detachable locking arrangements with the cradle side plate 42. As best shown at FIG. 6, the latch devices 91,91 which are pivotally mounted on the rail 88 such as by means of U-shaped pivot pins 91a, are barb-shaped at their lower ends 92 for engagement with spear-shaped abutments 93,93 which are affixed to the side plate 42, and arranged to be upwardly biased by means of tension springs 94. Thus, the latches as shown may be of the downwardly depressable types for release of the rail 88 from the side plate 42. However, it is to be understood that any other suitable type of manually releasable latch arrangement may be employed for locking the rail 88 relative to the side plate 42 during operation of the machine.

Thus, as shown at FIGS. 5 and 6, in order to facilitate machine clean-out and/or conveyor belt replacement purposes, the latches 91,91 may be released so that the conveyor belt pulley 64 may be upwardly inclined about the hinge mechanisms 90. The elastic endless conveyor belt may then be readily slid laterally away from the conveyor roller to provide for access to the interior of the machine and/or for belt replacement purposes.

Figure 8:
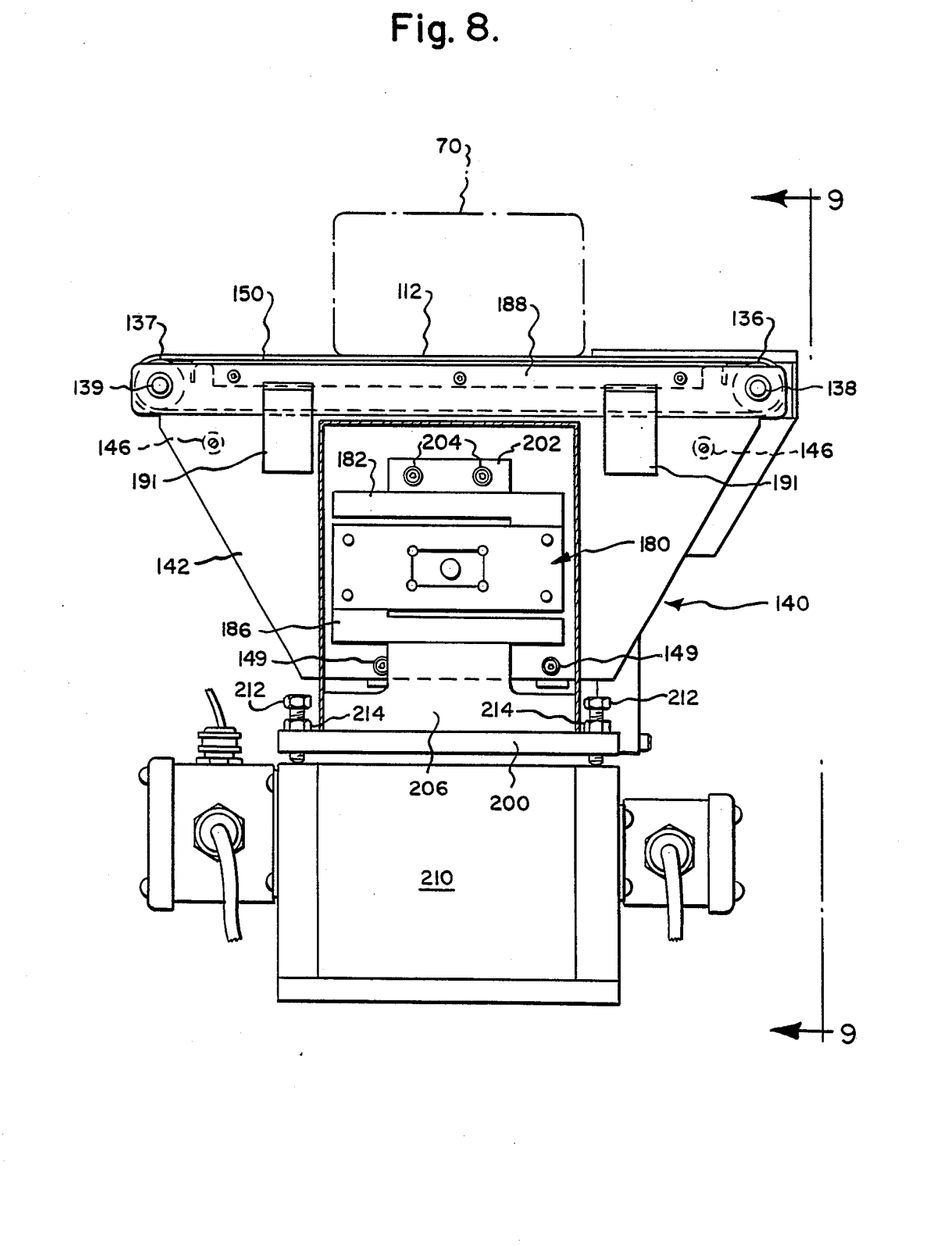
FIG. 8 is a view corresponding to FIG. 4, but taken as along line 8—8 of FIG. 1 and illustrating the form of machine embodying the invention such as is shown in FIG. 1.
Figures 9, 9A:
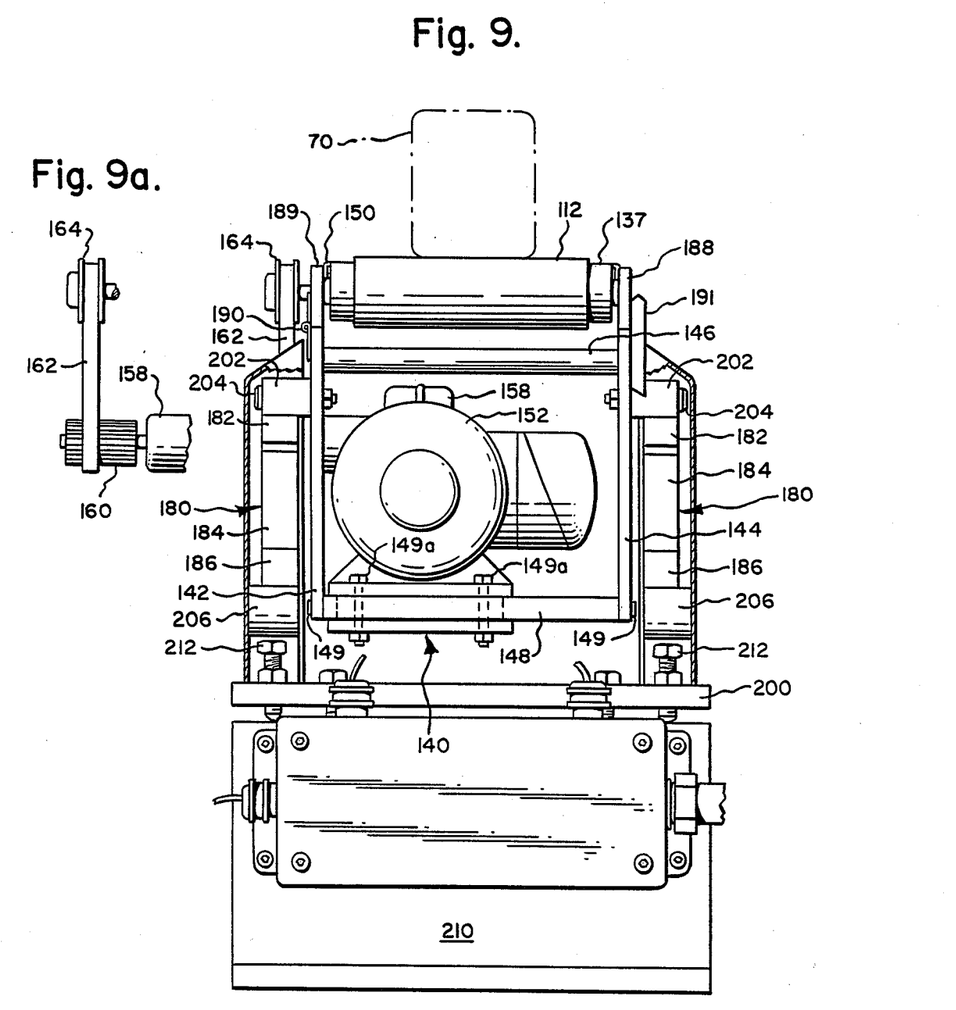
FIG. 9 is an end view taken as along line 9—9 of FIG. 8.
FIG. 9a is a fragmentary view further illustrating the conveyor drive mechanism of FIG. 9.

FIGS. 8 and 9 herewith illustrate another preferred form of the invention such as is also shown at FIG. 1, wherein the tare weight cage structure is designated generally at 140 and mounts a conveyor belt designated 112 by means of rollers 136,137 carried by axles 138,139. The chassis comprises a pair of opposite side wall panel members 142,144 which are interconnected by means of transverse struts 146,146 and a bottom plate 148 secured as by means of machine screws 149,149 to form a box-like cradle. A conveyor belt slide plate 150 is also provided as in the case of the machine of FIGS. 2–5 to form the "roof" of the chassis structure upon which the top flight of the conveyor belt 112 slides.

In this case, the conveyor drive motor and gear box units are designated 152,158 and set upon the base plate 148 and are positionally adjustable thereon and locked in place such as by means of bolts 149a,149a (FIG. 9). The conveyor 112 is driven by means of drive belt 162 (FIGS. 9 and 9a). However, the cage 140 and its supported components are in turn supported relative to a bottom plate 200 by means of shoulder pads 202,202 which are fixed such as by machine screws 204 to extend laterally from the side plates 142,144 of the cage as best shown at FIG. 9. These shoulder pads rest upon and are affixed to the upper beam components 182,182 of a pair of load cells which are designated generally at 180,180 and which are disposed at opposite sides of the machine; the lower beam components 186,186 thereof being based upon support blocks 206,206 which are carried upon opposite sides of the bottom base plate 200. The support blocks 206,206 rest upon the bottom plate 200 and the bottom plate is vertically adjustable on the machine base 210 such as by means of machine screws 212,212 and lock nuts 214,214.

As in the case of the machine of FIGS. 2–7, the total of the gross weight components of the assembly, including the conveyor, the conveyor drive, the cradle structure and the item being weighed as a unit is substantially statically mass-centered relative to the load cells 180,180 and as close as is practically possible about their operational axes. This may be effected upon initial assemblies of the machines having in mind the approximate weights of the items to be handled by the machine. However, as shown in FIGS. 2–7, the mounting bolts 56 and 83 permit the machine to be more finely adjusted to accommodate the weighing of items of various weights. The bolts 149a,149a permit adjustments for similar purposes of the machine of FIGS. 8 and 9. Whereas FIGS. 8 and 9 show employment of paired load cells operating under compression, it will of course be understood that such a dual cell arrangement may optionally be constructed so as to employ load cells of the tension type, such as shown in FIGS. 2–7.

It is of particular note that in any case employment of paired load cells located on opposite sides of the conveying-weighing system provides an improved facility for efficiently accommodating laterally vagarious placements of items to be weighed upon the conveyor component of the system. This problem typically occurs incidental to the handling in succession of erratically shaped/sized items of various weights. Also, this form of the machine of the invention may be built to more effectively accommodate wider conveyor belts, and therefore larger articles to be weighed, than other machines. In the case of the present invention, such differential loadings of the conveyor belt at opposite sides thereof are effectively nulled out; whereby accurate weight readings are nevertheless signalled to the associated display/recording/pricing devices or the like.

Figure 10:
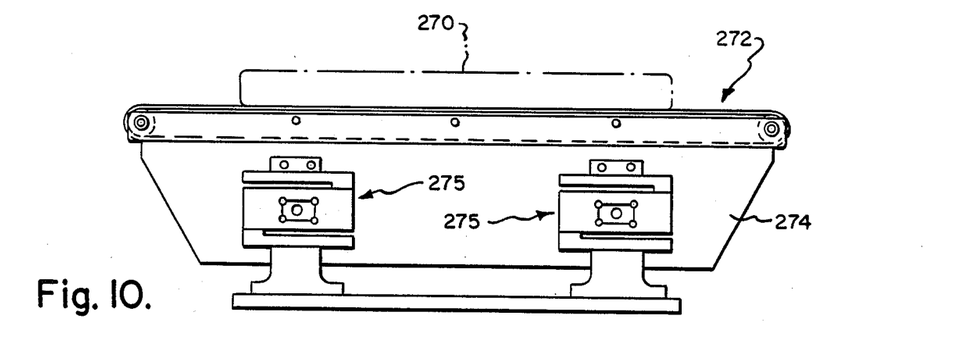
FIG. 10 is a view corresponding to either FIG. 4 or 8, but illustrating still another form of machine embodying the invention.

FIG. 10 illustrates schematically another modified form of machine embodying the invention such as may be better adapted to handle larger size items such as are shown at 270. The machine may be of either the single or dual load cell type such as are illustrated by FIGS. 2–7, 8 and 9, respectively, and is shown to comprise a conveyor 272 carried by side plates 274 which in turn are supported on a plurality of longitudinally in-line load cells such as are shown at 275,275. In such case, the signals from the load cells to the weight/price reporting converter system will be summed; and thus it will be appreciated that such a machine is of improved longitudinal stability characteristics when handling larger size items.

What is claimed is:

1. A machine for transporting and weighing or check-weighing articles passing in succession thereon at high speeds, such as for use in conjunction with a rapid article feeding and take-away conveyor system or the like and with weight-signal transmitting/converting/calculating printout devices for visual display and price labeling operations or the like; said machine comprising:

a stationary machine base;

a vertically flexible weight-measuring means supported by said base;

a rigid cage-like structure encompassing and supported by said weight-measuring means;

an article conveying device and a power supply means therefor carried by said cage-like structure and comprising in combination therewith the minusculely vertically shifting tare weight component of the machine;

said conveying device and said power supply means and the construction elements of said cage-like structure being so weight-related and positioned in said cage-like structure as to be substantially statically balanced and in equilibrium about the axes of said weight-measuring means, whereby said measuring means is shielded from effects of transitory force impingements upon said tare weight assembly such as would otherwise induce torque moments to operate on said assembly about the axes of said measuring means.

2. A machine as set forth in claim 1 wherein said conveyor drive means is positionally shiftable on said cage-like structure.

3. A machine as set forth in claim 1 wherein said weight-measuring means is of the leverless load cell type.

4. A machine as set forth in claim 1 wherein said vertically flexible weight-measuring means comprises separate load cell transducer devices resting upon laterally opposite portions of said machine base and wherein the weight signal outputs of said transducer devices are summed by said signal transmitting device, whereby vagariously lateral emplacements of articles of different sizes/shapes/weights on said conveying device result in accurate weight reports.

5. A machine as set forth in claim 4 wherein said conveyor drive means is positionally shiftable on said cage-like structure.

6. A machine as set forth in claim 1 wherein said weight-measuring means comprises a single load cell transducer suspended from a portion of said base structure.

7. A machine as set forth in claim 3 wherein said conveyor drive means is positionally shiftable on said cage-like structure.

8. A machine as set forth in claim 1 wherein said weight-measuring means comprises a plurality of transducer devices arranged in longitudinally tandem relation vis-a-vis said conveying device.

9. A machine as set forth in claim 8 wherein said conveyor drive means is positionably shiftable on said cage-like structure.

10. A machine as set forth in claim 1 wherein said article conveying device comprises an endless belt training about a pair of rollers located at opposite ends thereof and wherein one of said rollers is hingedly mounted at one of its side end portions upon said cage-like structure and is slidably mounted at its other side end portion upon said cage-like structure, and wherein a manually operable latch means is provided for maintaining said belt in operative position while permitting said one of said rollers to be released at one of its ends from said cage-like structure and hingedly swung arcuately therefrom so as to enable said belt to be side-wise slid over and away from said roller.

11. A machine as set forth in claim 10, wherein said belt is of longitudinally elastic form.

* * * * *